United States Patent
Drath et al.

(10) Patent No.: US 9,869,993 B2
(45) Date of Patent: Jan. 16, 2018

(54) SYSTEM AND METHOD FOR MONITORING AND/OR DIAGNOSING OPERATION OF A PRODUCTION LINE OF AN INDUSTRIAL PLANT

(71) Applicant: ABB Technology AG, Zurich (CH)

(72) Inventors: Rainer Drath, Seckenheim (DE); Mario Hoernicke, Landau (DE); Sönke Kock, Schriesheim (DE); Christoph Winterhalter, Bad Nauheim (DE)

(73) Assignee: ABB Schweiz AG, Baden (CH)

( * ) Notice: Subject to any disclaimer, the term of this patent is extended or adjusted under 35 U.S.C. 154(b) by 392 days.

(21) Appl. No.: 14/739,390

(22) Filed: Jun. 15, 2015

(65) Prior Publication Data
US 2015/0277429 A1 Oct. 1, 2015

Related U.S. Application Data

(63) Continuation of application No. PCT/EP2012/075397, filed on Dec. 13, 2012.

(51) Int. Cl.
| | |
|---|---|
| *G05B 19/406* | (2006.01) |
| *G05B 17/02* | (2006.01) |
| *G05B 23/02* | (2006.01) |

(52) U.S. Cl.
CPC .......... *G05B 19/406* (2013.01); *G05B 17/02* (2013.01); *G05B 23/0243* (2013.01);
(Continued)

(58) Field of Classification Search
CPC .. G05B 19/406; G05B 17/02; G05B 23/0243; G05B 2219/37616; G05B 2219/32179;
(Continued)

(56) References Cited

U.S. PATENT DOCUMENTS

| | | | |
|---|---|---|---|
| 2002/0123864 A1 | 9/2002 | Eryurek et al. | |
| 2012/0083906 A1* | 4/2012 | Weatherhead | G05B 23/0267 700/83 |

FOREIGN PATENT DOCUMENTS

EP     2 293 164 A1    3/2011

OTHER PUBLICATIONS

International Search Report (PCT/ISA/210) dated Aug. 21, 2013, by the European Patent Office as the International Searching Authority for International Application No. PCT/EP2012/075397.

* cited by examiner

*Primary Examiner* — Kyoung Lee
(74) *Attorney, Agent, or Firm* — Taft Stettinius & Hollister LLP

(57) ABSTRACT

A system and method monitor and/or diagnose the operation of a production line of an industrial plant which is controlled by an automation system. The system includes a remote data processing server, which is installed outside of the industrial plant. The remote data processing server is configured to receive a digital input signal reflecting at least one control input signal and a digital output signal reflecting a second operational state, to determine at least first and second modeled states corresponding to the at least first and second operational states, respectively, by inputting the digital input and the digital output signals to a digital observer model of the production line and the automation system and by processing the digital observer model, and to forward the first and second modeled states to an output interface from where they can be accessed by modeling and/or diagnosing modules.

18 Claims, 6 Drawing Sheets

(52) U.S. Cl.
CPC .............. *G05B 2219/32179* (2013.01); *G05B 2219/32301* (2013.01); *G05B 2219/32342* (2013.01); *G05B 2219/33286* (2013.01); *G05B 2219/35308* (2013.01); *G05B 2219/37616* (2013.01); *Y02P 90/26* (2015.11)

(58) Field of Classification Search
CPC ........... G05B 2219/33286; G05B 2219/32342; G05B 2219/32301; G05B 2219/35308; Y02P 90/26
See application file for complete search history.

SYSTEM AND METHOD FOR MONITORING AND/OR DIAGNOSING OPERATION OF A PRODUCTION LINE OF AN INDUSTRIAL PLANT

RELATED APPLICATIONS

This application claims priority as a continuation application under 35 U.S.C. §120 to PCT/EP2012/075397, which was filed as an International Application on Dec. 13, 2012 and which designates the United States. The entire content of this application is hereby incorporated by reference in its entirety.

FIELD

The present disclosure relates to a system and method for monitoring and/or diagnosing operation of a production line of an industrial plant. According to an exemplary embodiment, the operation of the production line is controlled by an automation system, and a first operational state and a second operational state of the production line are dependent on at least one control input signal to the production line.

BACKGROUND INFORMATION

EP 2 293 164 A1 discloses a process control and monitoring system for monitoring a distributed primary system, such as an electric power system, a water or gas supply system, or a telecommunication system. The process control and monitoring system is arranged in a distributed computing resource, called cloud resources. The process control and monitoring system receives connection sensor signals of the primary system via a network and provides such signals to the user via another network connection.

SUMMARY

An exemplary embodiment of the present disclosure provides a system for at least one of online monitoring and diagnostics of an operation of a production system of an industrial plant. The production system is a combination of a production line and an automation system controlling the operation of the production line. At least one first operational state and a second operational state of the production line are dependent on at least one control input signal to the production line. The exemplary system includes a remote data processing server installed outside of the industrial plant. The remote data processing server is connected to at least one of the production line and the automation system via a first data communication network. The remote data processing server contains an output interface connected to either (i) at least one of a monitoring module and a diagnosing module implemented in the remote data processing server, or (ii) at least one of the first communication network and a second data communication network distinct from the first communication network. The remote data processing server includes at least one processor configured to execute computer-readable instructions tangibly recorded on a non-transitory computer-readable recording medium. The remote data processing server is configured to, when executing the computer-readable instructions: receive, via the first data communication network, a digital input signal reflecting the at least one control input signal, and receive, as a measured operational state, a digital output signal reflecting the second operational state; determine at least one first modelled state and a second modelled state corresponding to the at least one first operational state and the second operational state, respectively, by inputting the digital input and the digital output signals to a digital observer model modelling the time-dependent operational behavior of the production line and the automation system and by processing the digital observer model; and forward the at least first and second modelled states to the output interface. The digital observer model contains a model of the production line based on at least one of linear state equations and non-linear state equations of elements of the production line, and a model of the automation system containing copies of the control functions performed by the automation system. The measured operational states include signal values of sensors or actuators, software states, and information about internal variables or instruction pointers of the software programs belonging to the automation system. The digital input signal and the digital output signal each contain a time stamp indicating a point in time when the at least one control input signal and when the second operational state were taken, respectively. The remote data processing server is configured to time synchronize the processing of the digital observer model with the time stamps of the digital input signal and the digital output signal.

An exemplary embodiment of the present disclosure provides a method for at least one of online monitoring and diagnosis of the operation of a production system of an industrial plant. The production system is a combination of a production line and an automation system controlling the operation of the production line. At least one first operational state and a second operational state of the production line are dependent on at least one control input signal to the production line. The method is performed by a remote data processing server which is connected to at least one of the production line and the automation system via a first data communication network. The remote data processing server contains an output interface connected to either (i) at least one of a monitoring module and a diagnosing module implemented in the remote data processing server, or (ii) at least one of the first data communication network and a second data communication network distinct from the first data communication network. The exemplary method includes: receiving, over the first data communication network, a digital input signal reflecting the at least one control input signal; receiving, as a measured operational state, a digital output signal reflecting the second operational state; determining at least one first modelled state and a second modelled state corresponding to the at least first operational state and the second operational state, respectively, by inputting the digital input signal and the digital output signal to a digital observer model of the production line and the automation system and by processing the digital observer model; forwarding the at least one first modelled state and the second modelled state to the output interface; providing the digital observer model to contain a model of the production line based on at least one of linear state equations and non-linear state equations of elements of the production line, and a model of the automation system containing copies of the control functions performed by the automation system; providing the measured operational states to include signal values of at least one of sensors and actuators, software states, and information about internal variables or instruction pointers of the software programs belonging to the automation system; providing the digital input signal and the digital output signal to each contain a time stamp indicating a point in time when the at least one control input signal and when the second operational state were taken, respectively; and time synchronizing the processing of the digital observer model with the time stamps of the digital input and output signals.

An exemplary embodiment of the present disclosure provides a non-transitory computer-readable recording medium having computer instructions tangibly recorded thereon that, when executed by a processor of a computer processing device in a remote data processing server, cause the computer processing device to carry out a method for at least one of online monitoring and diagnosis of the operation of a production system of an industrial plant. The production system is a combination of a production line and an automation system controlling the operation of the production line. At least one first operational state and a second operational state of the production line are dependent on at least one control input signal to the production line. The remote data processing server is connected to at least one of the production line and the automation system via a first data communication network. The remote data processing server contains an output interface connected to either (i) at least one of a monitoring module and a diagnosing module implemented in the remote data processing server, or (ii) at least one of the first data communication network and a second data communication network distinct from the first data communication network. By executing the computer instructions, the computer processing device of the remote data processing server is configured to: receive, over the first data communication network, a digital input signal reflecting the at least one control input signal; receive, as a measured operational state, a digital output signal reflecting the second operational state; determine at least one first modelled state and a second modelled state corresponding to the at least first operational state and the second operational state, respectively, by inputting the digital input signal and the digital output signal to a digital observer model of the production line and the automation system and by processing the digital observer model; forward the at least one first modelled state and the second modelled state to the output interface; provide the digital observer model to contain a model of the production line based on at least one of linear state equations and non-linear state equations of elements of the production line, and a model of the automation system containing copies of the control functions performed by the automation system; provide the measured operational states to include signal values of at least one of sensors and actuators, software states, and information about internal variables or instruction pointers of the software programs belonging to the automation system; provide the digital input signal and the digital output signal to each contain a time stamp indicating a point in time when the at least one control input signal and when the second operational state were taken, respectively; and time synchronize the processing of the digital observer model with the time stamps of the digital input and output signals.

BRIEF DESCRIPTION OF THE DRAWINGS

Additional refinements, advantages and features of the present disclosure are described in more detail below with reference to exemplary embodiments illustrated in the drawings, in which.

In the drawings, identical or similarly functioning components are provided with the same reference symbols, and an explanation of such components is provided only once, unless otherwise noted.

DETAILED DESCRIPTION

Figure 1:
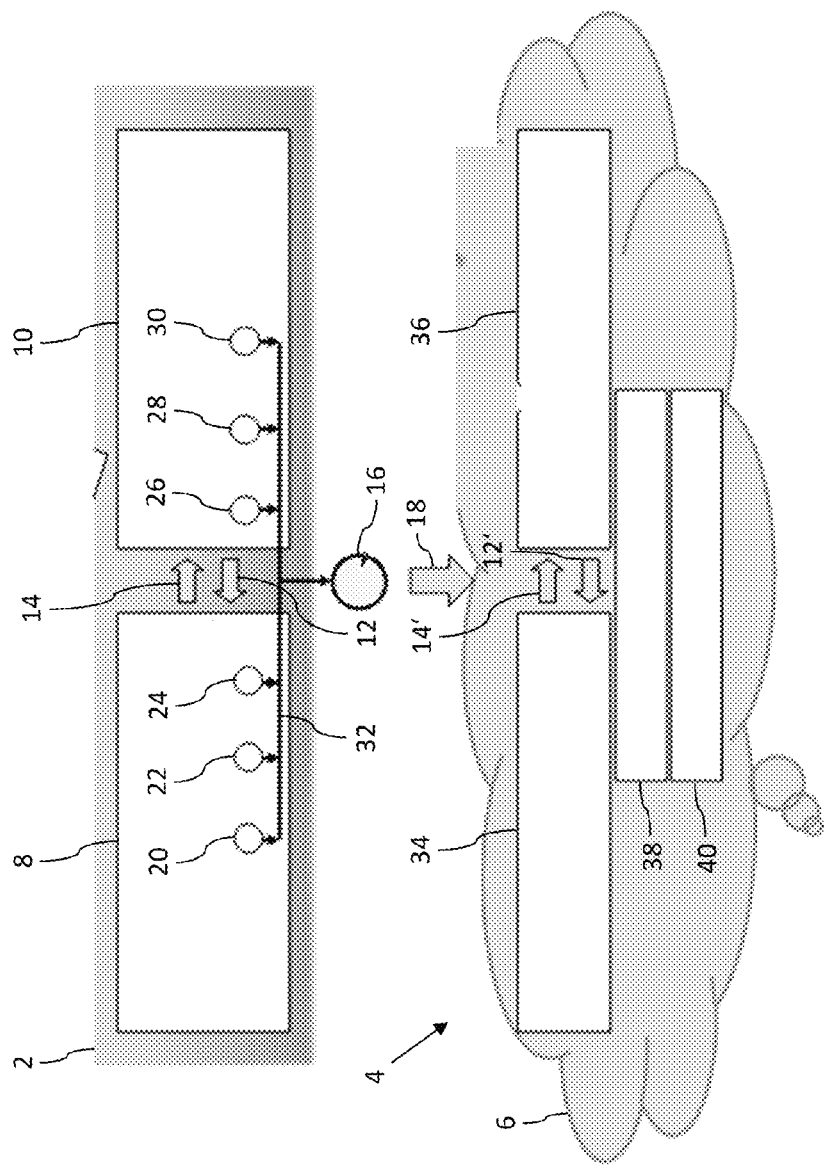
FIG. 1 shows an illustration of a production system that is connected to a model of the production system in a cloud-based storage system according to an exemplary embodiment of the present disclosure.

Exemplary embodiments of the present disclosure provide improved supervision and maintenance of a production system that includes a production line and an automation system controlling the production line.

Exemplary embodiments of the present disclosure provide a system for at least one of online monitoring and online diagnostics (e.g., diagnosing) of an operation of a production system of an industrial plant, wherein the production system is a combination of a production line and an automation system controlling the operation of the production line. According to an exemplary embodiment of the system and method of the present disclosure, at least one first operational state and at least one second operational state of the production line are dependent on at least one control input signal to the production line.

According to an exemplary embodiment of the present disclosure, the system for at least one of monitoring and diagnosing operation of a production line of an industrial plant includes a remote data processing server installed outside of the industrial plant. The remote data processing server is connected to the production line and/or automation system via a first data communication network and contains an output interface either to a monitoring and/or diagnosing module implemented in the remote data processing server or to the first or a second data communication network. According to an exemplary embodiment, the remote data processing server is configured to: receive over the first data communication network a digital input signal reflecting the at least one control input signal, and a digital output signal reflecting the second operational state; determine at least a first and a second modeled state corresponding to the at least first and second operational states, respectively, by inputting the digital input and the digital output signals to a digital observer model modeling the time-dependent operational behavior of the production line and the automation system and by processing the digital observer model, and forward the at least first and second modeled states to the output interface.

According to exemplary embodiment of the present disclosure, the method for monitoring and/or diagnosing operation of the production line includes the method steps performed by the remote data processing server.

The production line which is to be monitored and/or diagnosed might, for example, include as actuators robots, manipulators, drives and/or pumps that are, for example, interconnected by conveyors and/or pipes. The actuators are part of a real industrial plant that receives raw materials, for example, from tanks, and converts them into products based on a production process that is realized by the production line controlled by the automation system, where the production process is defined based on predetermined conditions, for example, by an operator. The actuators are provided by the automation system with the at least one control input signal, which causes the actuators to perform resulting control actions influencing the behavior of the production line and thereby the way the production process is executed. In the following, the combination of production line and automation system is also called a production system.

The digital input signal which reflects or contains information on the at least one control input signal can, for example, have a value which corresponds to the magnitude of the relating control input signal. The digital input signal may reflect the at least one control input signal as it is currently applied to the production line, which may assist in online monitoring and diagnosing. For offline monitoring and diagnosing, historical control input signals may be sent to the remote data processing server.

The provided system and method are based on the concept of reducing the number and amount of technical equipment needed in an industrial plant for providing required monitoring and/or diagnosing signals and information.

This is achieved by providing a digital observer model which models the time-dependent behavior of the production line and automation system, i.e. it includes a production line model and an automation system model, and which can be used to calculate operational states of the production line model and of the automation system model when the control input signals and at least one of the real operational states are known. Compared to the currently installed, plant-based monitoring and diagnosing systems, the number of sensor signals required and therefore of sensor units to be installed are reduced considerably, as many of the operational states are now calculated rather than measured. Further, it may now become possible to determine internal operational states which cannot be obtained through measurement by generating them with the digital observer model.

According to an exemplary embodiment, the processing of the digital observer model can be implemented in a remote data processing server which is installed outside of the industrial plant. Accordingly, the amount of data processing capacity which is required directly in the industrial plant for monitoring and/or diagnosing purposes is reduced as well.

According to an exemplary embodiment, the determined modeled states of the digital observer model are forwarded to a monitoring and/or diagnosing module implemented in the remote data processing server. The monitoring and/or diagnosing module may then process the modeled states as if they were measurements of the real production system and may then represent the outcome and results to an operator of the industrial plant via a Web page, for example. This means that the industrial plant, in addition to the few sensor signals, only needs to provide access to the one software application which runs on the remote data processing server for visualizing the monitoring and diagnostics results. The access to this software application is easily realized also from mobile communication devices, so that not only operators sitting in a control room, but also service personnel working in the field, can simultaneously use the digital observer model for monitoring and/or diagnosing purposes.

In accordance with an exemplary embodiment, part of the monitoring and/or diagnosing functionality is implemented on the side of the industrial plant. In this case, the remote data processing server is configured to pre-process the at least first and second modeled states for the monitoring and/or diagnosing purposes before forwarding them to the output interface.

According to an exemplary embodiment, the system and method of the present disclosure may also be used to facilitate an efficient control of the production line. Therefore, the digital observer model may serve for simulating the geometric, the kinematic and/or the behavioral conditions of the production line or parts of it, as exemplary production systems or control components or devices in the real plant object. The digital observer model may include, for example, models of devices, processes and signals of the production line, copies and or simplified models of the control functions performed in the automation system and also models of an interaction between the production line and the automation system. The digital observer model thus represents an imitation of the time-dependent behavior of the real plant.

However, the simulation of the real plant, i.e. the processing of the digital observer model requires suited simulators, emulators and stimulators that calculate an inner time-dependent state of the digital observer model, without having measurements of the corresponding real components of the real plant present. The simulation can therefore be used not only to determine the current operational states of the production system based on just the control input signals and a few sensor signals, but also to predict a future time-dependent behavior of the real plant. In addition, the digital observer model may be used to optimize the production process based on the results of the digital observer model, to validate the functionality or performance of elements of the production line or of control functions of the automation system, to train operators of the industrial plant, to schedule the production of the production line and so on. Depending on the required quality and precision of the modeled states, the digital observer model may be modeled in different abstraction levels. In accordance with an exemplary embodiments of the system and method of the present disclosure, it is recognized that the behavior of the production system is predicted by calculating the modeled states as discrete time-dependent signals, whereby it is assumed that the real time-dependent behavior of the operational states of the production system and the time-dependent behavior of the modeled states is the same.

As this can usually not be ensured during the whole running time of a production process, it is suggested that the digital input signal and the digital output signal each contain a time stamp indicating a point in time when the at least one control input signal and when the second operation state were taken, respectively, and wherein the remote data processing server is configured to time synchronize the processing of the digital observer model with the time stamps of the digital input and output signals.

Nevertheless, changes during the operation of the real plant, such as services and maintenances are not fed back to the digital observer model, such that a difference between the operational and the modeled states may steadily increase, and the reality is not reflected any more.

Therefore, in accordance with an exemplary embodiment of the system and method of the present disclosure, the remote data processing server can be configured to compare the digital output signal with the second modeled state and to adapt the digital observer model based on the result of the comparison. According to an exemplary embodiment, the processing of the digital observer model can be started from a well-defined initial state, where the initial state may, for example, be achieved by starting the production process and the processing of the digital observer model simultaneously, or by waiting until the production system have reached a steady state or a well-defined state and by triggering the processing of the digital observer model accordingly.

It is further suggested to collect data in the production system that describe a specific operational state of the production system, when the automation process in the real plant already runs. This feature of the present disclosure is based on the concept that the initial state of the production system and therefore of the digital observer model is unknown when starting to simulate the behavior of the real plant, where this may lead to the above mentioned difference between the simulation and the reality. Based on this concept, an information interface to the automation system in the form of a data collector is provided which has access to all required information that describe an initial or well-defined state of the production system. This data collector system may, for example, be distributed in different subcomponents responsible for collecting information from different parts of the production system. Once a certain operational state of the running production system is known, it might be used to update the digital observer model to close a gap between the simulation and the reality. In other words, the provided method proposes to track the digital observer model to the reality at least from time to time.

Starting from the tracked digital observer model, the simulation of the real plant is closer to the reality such that exemplary break downs can be estimated with a higher reliability. Even if a breakdown or another error could not be timely detected, the tracked digital observer model can be used to reconstruct the situation leading to the breakdown or error in a more reliable way, since in contrast to an initial boundary condition used to start the simulation of the real plant based on the digital observer model, the last operational state might already include an information about a trigger that leads to the breakdown or the error. Consequently, a downtime of at least parts of the real plant can be reduced. In this respect, the method and system of the present disclosure also reduces the hardware effort to track the trigger leading to the breakdown or the error, since all necessary data to analyze the broken down or erroneous part of the real plant are already available in the digital observer model and need not to be tracked in the field in a cumbersome way. A special service team in the field for tracking data in the field with measurement instruments will also become at least partly superfluous.

As production lines and production systems usually are comparatively complex, it is further suggested that the digital observer model is divided into at least two sub-models modeling the time-dependent operational behavior of at least two corresponding parts of the production line and the automation system.

Further, in accordance with an exemplary embodiment of the system and method of the present disclosure, the operational states of the production system may include all information that is necessary to fully describe the characteristics of the production system at or up to a certain point in time. However, in line with the provided system and method, the operational states of the production system might also only comprise a part of this information, depending on the monitoring and/or diagnosing requirements. The operational states can be for example include signal values of sensors or actuators, software states, information about internal variables or instruction pointers of the software programs running on control devices and communication systems, i.e. belonging to the automation system.

The system and method of the present disclosure enable a service team to analyze the production system's behavior or to predict maintenance. However, in line with the provided system and method, it is recognized that with the formerly used techniques, access to the operational states of the production system was limited, as the service team had no view of those signals which were not or could not be measured. This view is now provided by the digital observer model. In this way, the service team is able to check all necessary information about the production system based on the digital observer model which modeled states are sufficiently close to the real operational states of the production system.

In accordance with an exemplary embodiment, the remote data processing server is implemented on a distributed processing system including distributed storage means. Accordingly, the provided method and system include the feature of running the digital observer model on a distributed processing system including distributed storage means (referred to as a "cloud"), where the distributed processing system is connected to the production system via the first network connection. In line with the provided system and method, a cloud shall be a network of computers that behave like a single computing component. It might be used for a wide range of applications from low complex applications, e.g. storage, up to high complex applications which are able to provide complex and full featured virtual PCs with their specific software, interfaces and operating system.

A simple cloud application might be a shared storage that behaves like an external hard drive, but provides synchronization functionality that mirrors data from the cloud to a local folder. Changes in both the cloud and the local folder are automatically synchronized in the background without user interaction. Different vendors provide storage that allows storage of data in a shared storage that is permanently synchronized with a local folder on the personal computer of different users. For this, the vendor specific software is installed on each individual PC that permanently performs the synchronization process in the background in case of online access. Furthermore, this technology allows file sharing across different operating systems. Synchronization software is provided for several platforms, like MS Windows, Android, Linux, etc. that allows data synchronization and updating from mobile device, as well. Finally, versioning functionality on file level is provided, which allows restoring data from older versions and tracking changes.

A complex cloud application, as in the present embodiment, might be the utilization of a network of computers used to share computing power between several different types of servers, like data servers, active directory servers, etc., offered for executing functions and algorithms directly in the cloud. The advantage of the cloud technology is that not only storage, but also computing power may be temporarily or statically ordered, in order to perform larger software on a specific virtual machine or move more virtual machines into it. Dependent on the complexity of the digital observer model, the cloud technology can thus be used to run it on distributed computation resources to achieve the simulation results before the modeled states of the digital observer model become out of date, since the operational states of the real production system already moved further.

In accordance with an exemplary embodiment, the method includes the step of storing the updated modeled states in the distributed storage. This allows not only accessing the modeled states as long as a network connection to the distributed storage is available, which clearly facilitates the remote monitoring and diagnosing of the real production system, the data traffic of the updated modeled states might also become very high, which might be impossible to be stored on a storage device locally provided at the production system. In this respect, the distributed storage and thus the cloud can enable to reduce occurring data traffic and to store all versions of the updated modeled states over a predetermined time period, to give a service team insight into the operational states of the production system at any later time based on the digital observer model, without any interruption over this predetermined time period.

In accordance with an exemplary embodiment of the system and method of the present disclosure, the at least first and second modeled states are determined continuously, periodically or on a triggered basis. While a continuous updating of the modeled states always provides information on the most actual operational states of the production system, a periodical update reduces the required data traffic. When using a triggered updating, the updating can be controlled, for example to achieve the best results in case of a given limited bandwidth to transmit the measured operational state of the production system.

In accordance with an exemplary embodiment of the system and method of the present disclosure, the measured operational state or states of the production system includes at least one of (i) signal values of sensors and/or actuators of the production system, (ii) software states of the automation system, and/or (iii) information about internal variables and/or instruction pointers of functions or software applications currently executed on devices belonging to the production system and/communication systems communicating with the automation system.

In accordance with an exemplary embodiment of the system and method of the present disclosure, the modeled states of are determined with a speed that is higher than a speed in which the operational states of the production system are changed. This means that it is possible to predict a future behavior of the production system and to recognize possibly occurring errors or breakdowns early enough to prevent them.

In accordance with another exemplary embodiment, if there is a change required in the production system, this change can be tested beforehand by using the digital observer model and starting from a current state of the production system. The digital observer model may include abrasion and other time dependent influences on at least parts of the production system. Thus, the effect of the required change on the production system can be tested based on a simulation with the digital observer model with a higher reliability.

An advantage of the system and method of the present disclosure is that a bottleneck of the production system can by identified based on the running model. Synchronously thereto, scenarios for preventing the bottleneck can be tested in advance without affecting the operation of the production system.

According to an exemplary embodiment of the present disclosure, the remote data processing server is configured to process a training model containing the digital observer model and a model of a control room system, wherein the control room system includes an input for an operator to affect operation of the automation system.

Further, a method for training an operator of an automation system includes: performing an above provided method; storing the updated modeled states; and starting a training model to simulate the production system based on the updated modeled states, wherein the training model includes an input for the operator to change the updated modeled states.

The stored updated modeled states may reflect unforeseeable situations for the production system, which are difficult to establish merely based on mathematics. These unforeseeable situations can thus be suitably used to train an operator of the production system to react suitably.

In accordance with an exemplary embodiment of the present disclosure, the remote data processing server includes a non-transitory, non-volatile memory (i.e., a computer-readable recording medium, such as a ROM, hard disk drive, flash memory, optical memory, etc.) and a data processor that is either a general purpose processor or an application specific processor. The processor of the remote data processing server is configured to execute computer instructions and/or a computer program tangibly recorded on the non-transitory memory to carry out the operative functions of the remote data processing server as described herein. Therefore, according to an exemplary embodiment, the processor of the remote data processing server is configured to carry out the steps of the method of the present disclosure, when the computer program/instructions is/are loaded from the memory and executed by the processor of the remote data processing server.

According to an exemplary embodiment, the above-described computer program is loaded into the remote data processing server by being recorded on the non-transitory medium of the remote data processing server and then executed by the processor of the remote data processing server.

According to a further aspect of the disclosure, an electronic storage means stores a provided computer program and/or a digital observer model that is updated based on one of the above provided methods.

FIG. 1 schematically shows an illustration of a production system 2 that is connected via a wired and/or wireless first data communication network to a digital observer model 4 of the production system 2 in a cloud-based remote data processing server, which may hereinafter be simply referred to as the cloud 6.

The production system 2 includes a production line 8 that, for example, receives raw materials and forms a product out of those raw materials by performing a production process. This production line 8 and its production process is controlled by an automation system 10, which may also be called a control system. According to an exemplary embodiment, the automation system 10 may provide control input signals 12 to the production line 8, for example, to actuators in the production line 8, and receive measurement values 14 of operational states of the production line 8. In accordance with an exemplary embodiment, the automation system 10 may include at least one programmable logic controller, which may be called PLC 10 hereinafter. The PLC 10 includes at least one computer processing device (e.g., a computer having at least one computer processor (e.g., a general purpose processor an application specific processor) configured to execute computer-readable instructions which are tangibly recorded on a non-transitory computer-readable recording medium (i.e., non-volatile memory) for carrying out the operative functions of the automation system/PLC 10 as described herein. According to an exemplary embodiment, the PLC 10 may provide closed loop control based on the values of the signals 12, 14 by controlling the production line 8 based on the control values or control input signals 12 that are themselves generated based on the measurement values 14.

In the exemplary embodiment illustrated in FIG. 1, a data collector 16 is provided that collects data 18, for example, a digital input signal reflecting at least one of the control input signals, and a digital output signal reflecting at least one of the operational states, from the production system 2 to transmit these data 18 to the digital observer model 4 in the cloud 6. The part of data 18 which comes from the production line 8 and from the corresponding production process can, for example, include state variables 20, sensor variables 22 and/or actuator variables 24. The part of data 18 which comes from the PLC 10 can, for example, include control pointers 26, values of internal variables 28 or software states 30. The data 18 might be exemplary collected via a data bus 32 and thus provided to the data collector 16.

In the cloud 6, the digital observer model 4 may include a process model 34 and a PLC model 36 to simulate the time-dependent behavior of the production system 2, wherein process model 34 represents both the production line 8 and the production process performed by it. The modeling of systems such as the production system 2 is known to the skilled person in the art and should thus not be explained in detail for the sake of brevity. In line with the production system 2, the process model 34 is controlled by the PLC model 36 that may also constitute a closed control loop based on respective control values 12' and modeled states 14' that result from the above-mentioned simulation of the production system 2.

The simulation itself is performed by a simulation program 38 that utilizes the models 34, 36 to simulate the time-dependent behavior of the production system. Further, an analyzer component 40 may be provided that enables service personnel to look into the models 34, 36 and to analyze the simulated production system 2. In accordance with an exemplary embodiment, the cloud 6 (i.e., the cloud-based remote data processing server) includes at least one computer processing device (e.g., a computer such as a server computer) that has at least one processor (e.g., a general purpose processor an application specific processor) configured to execute the simulation program 38 and perform the operative functions of the analyzer component 40 as described herein.

To explain the embodiment of FIG. 1 in further detail, an exemplary production system 2 is described with reference to FIG. 2.

Figure 2:
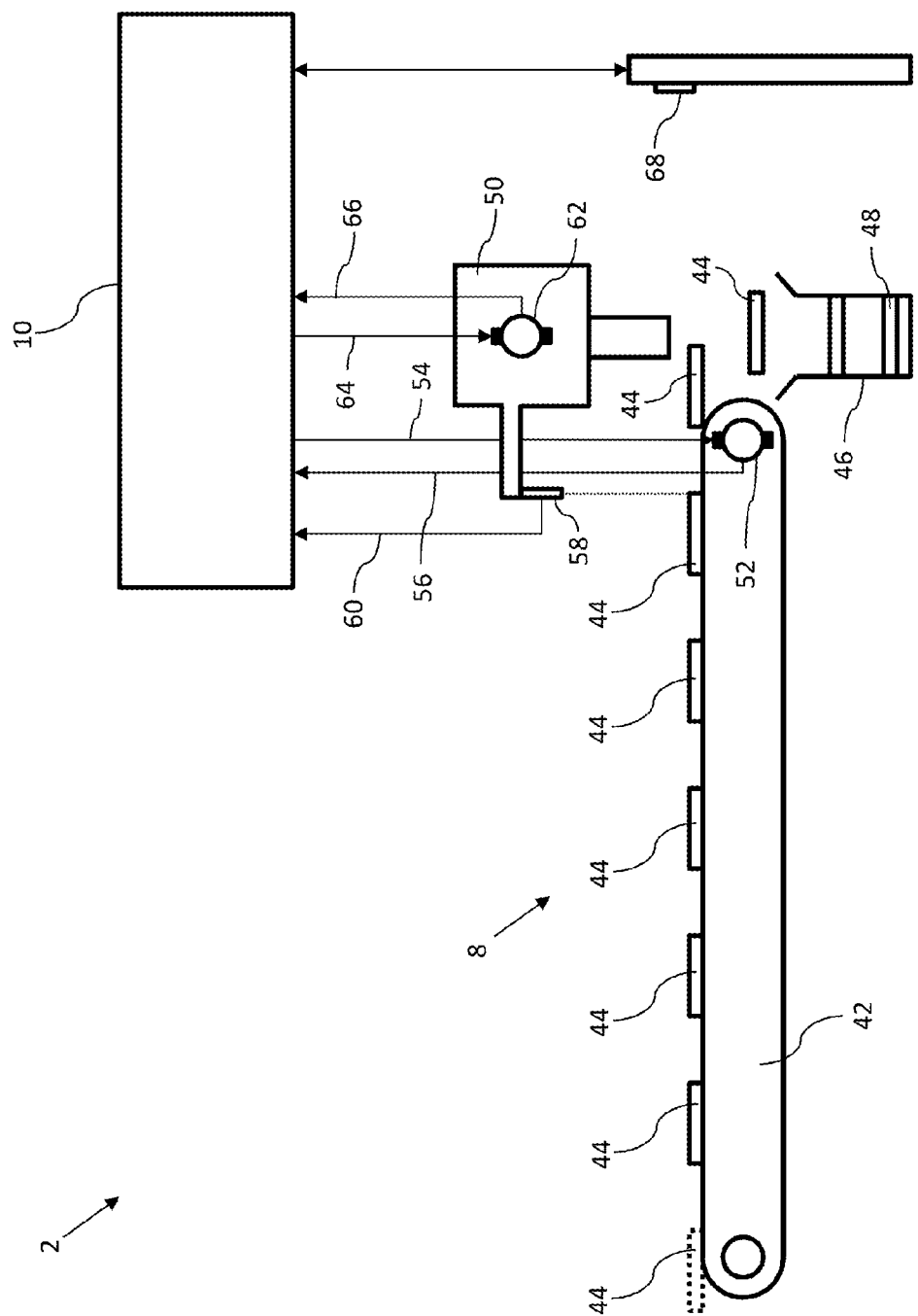
FIG. 2 shows an exemplary embodiment of the exemplary production system of FIG. 1.

In the example of FIG. 2, the production system 2 can transport via a conveyor belt 42 metal sheets 44 that are collected in a container 46 to form a lamination stack 48. Such a lamination stack 48 might be used, for example, as a rotor for an electromotor in a way that is known to the skilled person in the art. The collected metal sheets 44 forming the lamination stack 48 are connected together via a mechanical press 50 in a way that is known to the skilled person in the art.

The conveyor belt 42 includes an electric conveyor motor 52 that is velocity (speed) controlled by the PLC 10. For that purpose, the PLC 10 outputs a conveyor current 54 to the conveyor motor 52 based on a received conveyor velocity 56 from the conveyor motor 52. In operation, the metal sheets 44 might be loaded on the conveyor belt 42 by an assistant, for example. The conveyor belt 42 controlled by the PLC 10 in the above-described way transports the metal sheets 44 to the container 46 that will thus be filled with the sheets 44. An electric eye 58 detects the metal sheets 44 on the conveyor belt 42 and outputs, for each passing metal sheet 44, an impulse 60 to the PLC 10 such that the PLC 10 can count how many metal sheets 44 are in the container 46. If there are enough metal sheets 44 in the container 46, the PLC 10 stops the conveyor belt 42 by stopping the conveyor current 54 and starts operating the mechanical press 50. The mechanical press 50 is driven by an electric press motor 62 that is force controlled by the PLC 10. For that purpose, the PLC 10 outputs a press current 64 to the press motor 62 based on a received press force 66 from the press motor 62. After the operation of the mechanical press 50, when the metal sheets 44 are connected together, the PLC 10 stops the production process of production line 8 until the container 46 is unloaded.

In the present embodiment, the above-mentioned assistant might unload the produced lamination stack 48 from the container 46 and continue the operation of the production line 8 by pressing a start button 68 that outputs a start signal 70 to the PLC 10.

In the exemplary embodiment illustrated in FIG. 2, the production line 8 of the production system 2 includes two actuators (i.e., conveyor motor 52 and press motor 62), which are synchronized in their operation by the PLC 10.

Figure 3:
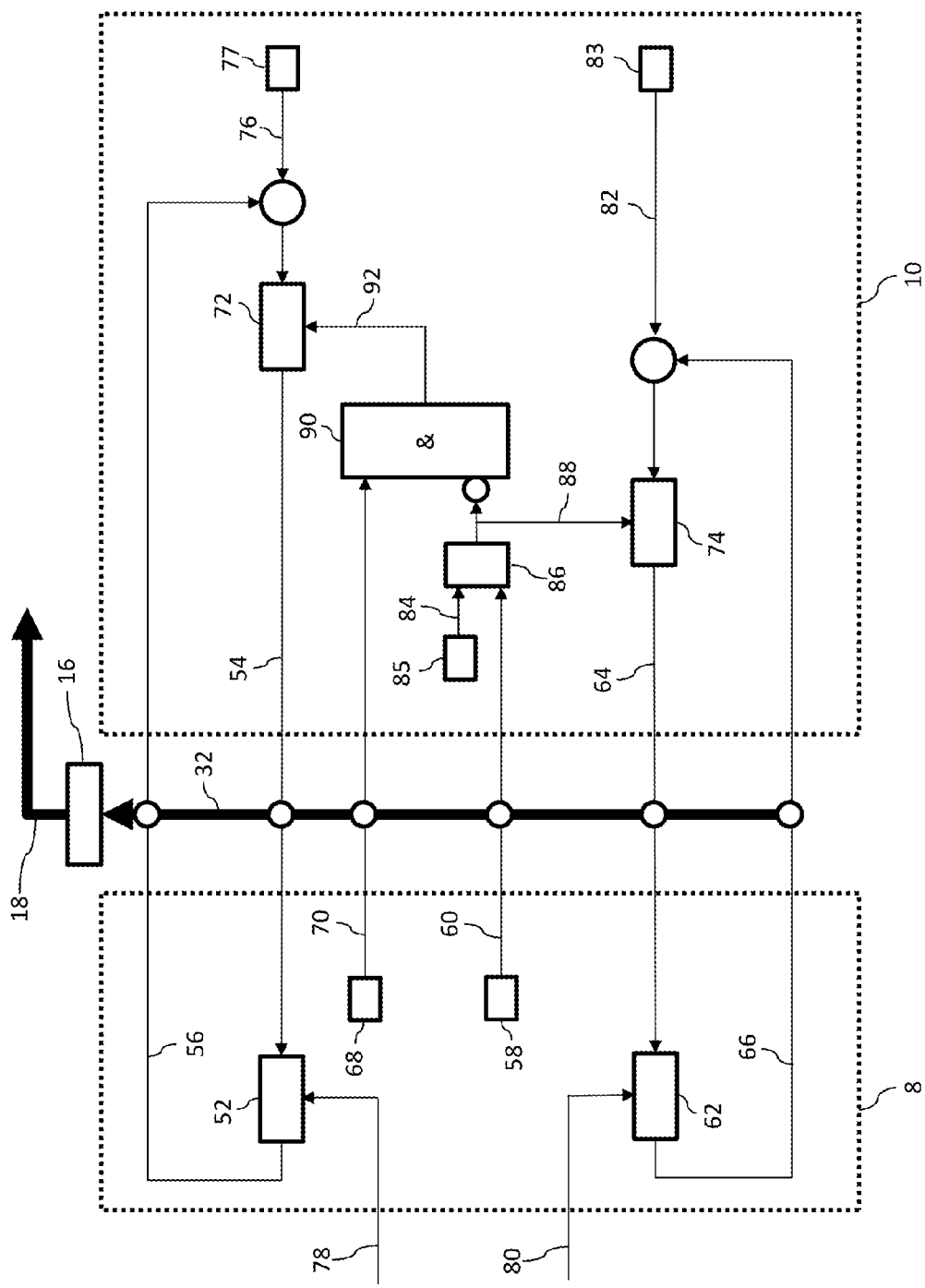
FIG. 3 schematically shows a signal process flow of the exemplary production system of FIG. 2.

FIG. 3 shows a signal process flow plan of the production system 2 of FIG. 2, according to an exemplary embodiment of the present disclosure.

As already mentioned, the PLC 10 of FIG. 2 provides two closed control loops. In the first of these closed control loops, the PLC 10 controls the conveyor motor 52 with a conveyor controller 72. In the second of these closed control loop, the PLC 10 controls the press motor 62 with a press controller 74.

In the first closed loop, the PLC 10 generates a not referenced difference between a desired velocity 76, which is stored in a velocity storage 77 (e.g., a non-transitory, non-volatile memory), and the conveyor velocity 56 in a way known by the skilled person in the art. The conveyor controller 72 receives that difference and generates the conveyor current 54 in a way reducing the difference to zero. Any conveyor disturbances 78 on the conveyor motor 52 might increase the above-mentioned difference between the desired velocity 76 and the conveyor velocity 56 and thus lead to a change in the conveyor current 54. Such a conveyor disturbance 78 might, for example, be fouling or wear in the conveyor belt 42 requiring the conveyor motor 52 to drive the conveyor belt 42 with a higher force to keep the desired velocity 76. This higher force requires a higher conveyor current 54 to drive the conveyor motor 52. Consequently, any change in the conveyor current 54 might indicate a conveyor disturbance 78.

In the second closed loop, the PLC 10 generates a not referenced difference between a desired force 82, which is stored in a force storage 83 (e.g., a non-transitory, non-volatile memory), and the press force 66 in a way known by the skilled person in the art. The press controller 74 receives that difference and generates the press current 64 in a way reducing the above-mentioned difference to zero. As in the first closed loop, any press disturbance 80 in the second closed loop might increase the above-mentioned difference between the desired force 82 and the press force 66 and thus lead to a change in the press current 64. Such a press disturbance 80 might, for example, be a decreased lubrication of a gear in the mechanical press 50 requiring the press motor 62 to drive the mechanical press 50 with a higher force to keep the desired force 82. As in the first closed control loop, the higher force requires a higher press current 64 to drive the press motor 62. Consequently, any change in the press current 64 might indicate a press disturbance 80.

To run the production line 8 in FIG. 2, the PLC 10 has to synchronize the operation of the conveyor controller 72 and the press controller 74. As mentioned with reference to an exemplary embodiment described below, the conveyor belt 42 shall start to run when the assistant presses the button 68 providing the start signal 70 and as long as the amount of metal sheets 44 in the container 46 does not exceed a certain value 84 that might be stored in a limit storage 85 (e.g., a non-transitory, non-volatile memory). For that purpose, the PLC 10 includes a counter 86 that counts the received impulses 60. When the amount of received impulses 60 exceeds the certain value 84, the counter 86 outputs a counter signal 88. A comparator 90 compares the start signal 70 and the counter signal 88 and outputs a comparator signal 92 that activates the conveyor controller 72 and thus the conveyor motor 52, when the start signal 70 is active and the counter signal 88 is inactive. If, respectively, the amount of received impulse signals 60 in the counter 86 becomes equal to the certain value 84, the counter signal 88 of the counter 86 gets high, activating the press controller 74 and respectively deactivating the conveyor controller 72 via the thus deactivated comparator signal 92.

In the present embodiment, the data collector 16 may be configured to collect, for example, as data 18, all digital input signals reflecting the control input signals generated by PLC 10 and transmitted to actuators in production line 8, as well as at least one operational state of the production line 8 and/or at least one operational state of the PLC10. These collected data 18 are then transmitted to a storage location in the cloud 6, which storage location is accessed by the simulation program 38.

Figure 4:
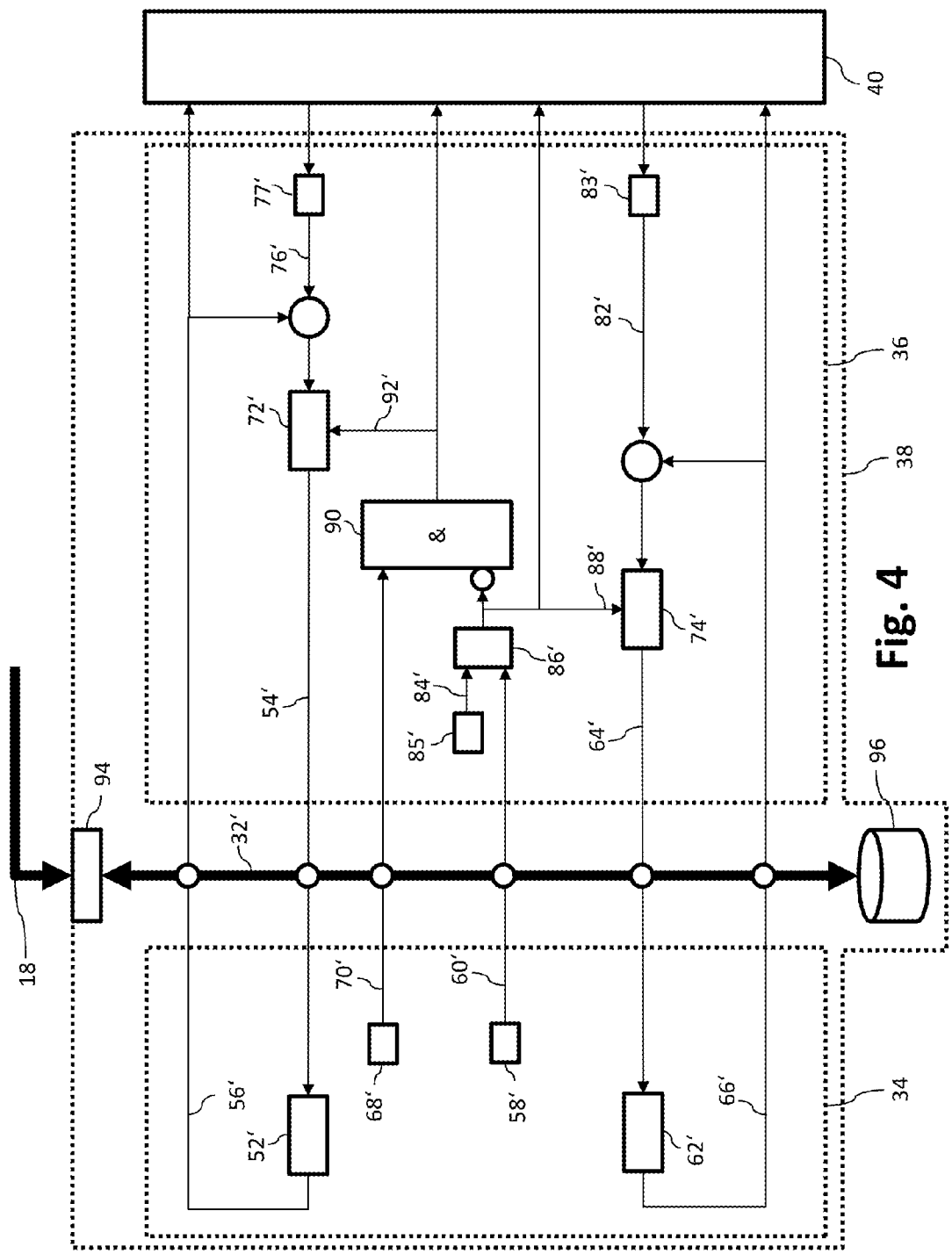
FIG. 4 schematically shows a signal process flow of a simulation program simulating the exemplary production system of FIG. 2.

FIG. 4 schematically shows a signal flow plan of the simulation program 38 that simulates the production system of FIG. 2 based on the process model 34 and the PLC model 36, according to an exemplary embodiment of the present disclosure. In the models 34, 36 of FIG. 4, all simulated elements that correspond to real elements in the production system are referenced with the same reference symbols as in FIGS. 2 and 3. Therein, the simulated element is indicated by an apostrophe and will not be described again for the sake of brevity.

Based on the simulation program 38 and the used models 34, 36 therein, the production system can be monitored and/or diagnosed in detail. Amongst other applications or purposes, such a diagnosis might be, for example, directed to the question of whether the operation of the two actuators 52, 62 in the production system 2 is well synchronized, or whether bottle necks occur in the provision of raw material. Another possibility might be a simulation of possible changes in the production system, wherein amendments in the production rate might be assessed by a systematic sequence of automated tests. The monitoring might further include finding potential error cases, which might lead to a breakdown of a part of or even the complete production system 2. Alternatively or additionally, the above-mentioned assistant or other service personnel might be trained based on the simulation program 38 prior to working with the real production system 2.

For the above-mentioned purposes, the process model 34 and the PLC model 36 might be set to initial start conditions, called boundary conditions, when a simulation of the production system 2 should be started. Then, the simulation of the production system 2 might be run based on the process model 34 and the PLC model 36 until a point in time, where a time period of special interest for the above-mentioned monitoring and/or diagnosing starts. For example, in case of an error, the simulation of the production system 2 might be run until a point in time shortly before the error occurred.

However, there may be situations where the chance to find an error or the reason for that error is small, because the process model 34 may not consider all possible side effects, such as aging or wear and tear of elements of the production line 8. Examples for un-modeled behavior of production line elements are the conveyor disturbance 78, such as fouling in the conveyor belt 42, and the press disturbance 80, such as the decreased lubrication of a gear in the mechanical press 50, i.e. these disturbances 78 and 80 are unknown for the process model 34.

This drawback can make it hard to find an error or at least the reason of the error based on the above-mentioned simulation of the production system 2. In such cases, the field work of a service engineer at the real production system 2 would still be required. However, such a service engineer must travel to the real production system 2 and is not available for other purposes like testing optimization scenarios or providing remote assistance to other customers. Thus, the above-mentioned error causes considerable extra effort in two aspects, namely due to the downtime of the real production system 2 when the service engineer travels to the real production system 2 and due to the unavailability of the service engineer at his home place. In other words, the effort for the maintenance of the real production system 2 might be reduced considerably, when the simulation program 38 with the program model 34 and the PLC model 36, together with data of at least one operational state of the production system reflecting a subsequent effect of the error, can be used to identify the above-mentioned error.

To enable diagnosis for finding the above-mentioned error or other kinds of the above-mentioned monitoring or tests, an exemplary embodiment of the present disclosure provides that the process model 34 and the PLC model 36 are regularly re-aligned with the data 18 that are collected by the data collector 16 in the production system 2. For that purpose, the simulation program 38 in the cloud 6 includes a data distributor 94 that receives the data 18 from the data collector 16 in the real production system 2 and distributes the data 18 to signals in the simulation program 38, which correspond to the signals in the real production process 2 from which the data 18 has been taken. This distribution might accordingly be performed via a virtual data bus 32'.

In the illustrated exemplary embodiment, the transmission of the data 18 and thus the re-alignment between the real production system 2 and the simulation program 38 can be, for example, triggered based on the start button 68. That is, every time the assistant presses the start button 68, the process model 34 and the PLC model 36 will be updated based on the data 18 transmitted from the production line 8 and the PLC 10 of the production system 2. By that means, each production cycle in the automation system 2 following on the re-alignment can be simulated closer to the reality, which is particularly useful if an error occurs during the production cycle following on the synchronization.

In case of an error, the above-mentioned service engineer can access the simulation program 38 which is, for example, in the cloud 6 via the analyzer component 40, which can be any computer processing device, such as a handheld computer or tablet computer, on which a monitoring and/or diagnosing software application is running and executed by a processor (e.g., general purpose or application specific) of the analyzer component 40 when the processor retrieves the software application from a non-transitory computer-readable recording medium (i.e., non-volatile) of the analyzer component 40. The service engineer can thus reconstruct the real situation in the production system 2 based on running the simulation program 38 with the process model 34 and the PLC model 36. The service engineer can debug the sequence of the program steps in the PLC model 36, for example, to find any non-synchronization between the conveyor belt 42 and the mechanical press 50. The service engineer can also supervise some or all signals in the simulation program 38 or even test a reaction of amendments in the production system by resetting some of the values in the simulated storages 77', 83'. For a clearer representation of the facts, in FIG. 4 the analyzer component 40 is connected to only a part of the signals, storages and other elements in the models 34, 36. However, principally, the service engineer shall have access to all elements in the models 34, 36 that are of interest to him.

The simulation program 38 might, for example, include the possibility to store all or a part of the operational states of the models 34, 36 in a database 96 (non-transitory and non-volatile), which may be located in cloud 6 as well. By that means, digital copies of the operational states of the real production system 2 that might be of interest for a further analysis, for an above-mentioned training of the above-mentioned assistant or for any other suitable purpose, can be stored in the database 96 and can be retrieved, for example, by the analyzer component 40 at any suitable point in time. The database 96 thus allows storing a history of the real production system 2 to increase the available information about the real production system 2 in the cloud 6.

Figure 5:
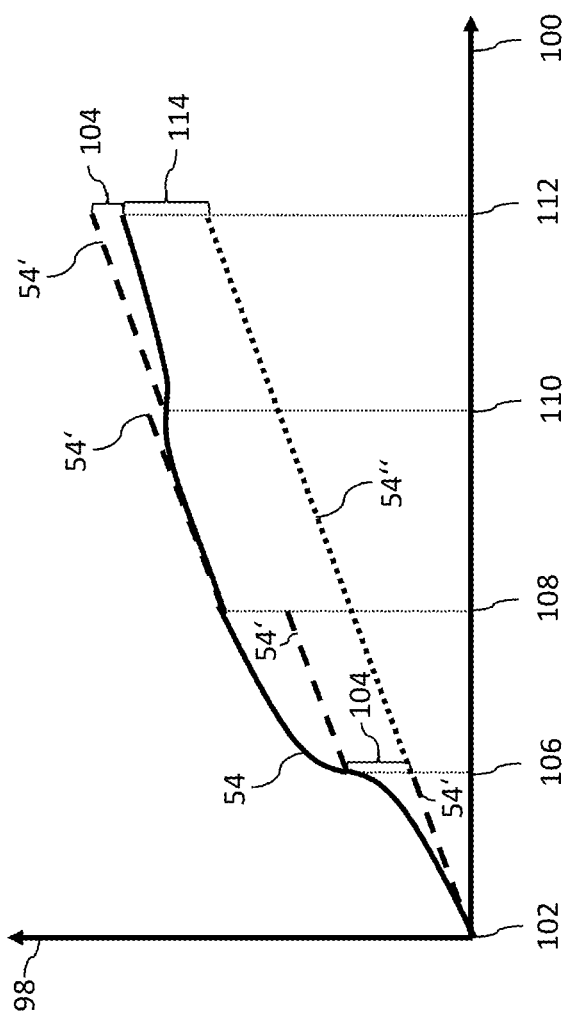
FIG. 5 is a diagram illustrating time-dependent behavior of one state variable in the digital observer model of the exemplary production system according to FIG. 4, and FIG. 6 schematically shows an overview of the interaction between a production system and a remote data processing server according to an exemplary embodiment of the present disclosure.

FIG. 5 is a diagram showing a current 98 over time 100 to illustrate the time-dependent behavior of the real conveyor current 54 and the simulated conveyor current 54'.

When the simulation program 38 starts at a first point 102 in time 100 and when the initial start conditions, i.e. the boundary conditions, of the production system 2 and of the simulation program 38 are the same, the real conveyor current 54 and the simulated conveyor current 54' are equal. Nevertheless, due to the above-mentioned conveyor disturbance 78, the real conveyor current 54 and the simulated conveyor current 54' start to drift away from each other such that the conveyor current 54 will be simulated with a simulation error 104 at a second point 106 in time 100.

At the second point 106 in time 100, the simulation error 104 is compensated by the above-mentioned re-alignment of operational states between the automation system 2 and the models 34, 36 in the simulation program 38, such that the real conveyor current 54 and the simulated conveyor current 54' are set to be equal at the second point 106 in time 100. In the present embodiment, this method will be repeated at a third point 108 in time 100, a fourth point 110 in time 100 and a fifth point 112 in time 100. As already mentioned, this re-alignment at these points 102, 104 to 112 in time 100 might be triggered by pressing the start button 68, for example.

As a result, the simulation error 104 will be kept smaller than a further simulation error 114 that would result when the conveyor current 54 would be simulated without any re-alignment with the automation system 2 that is indicated in FIG. 5 with a pointed line provided with the reference symbol 54".

Figure 6:
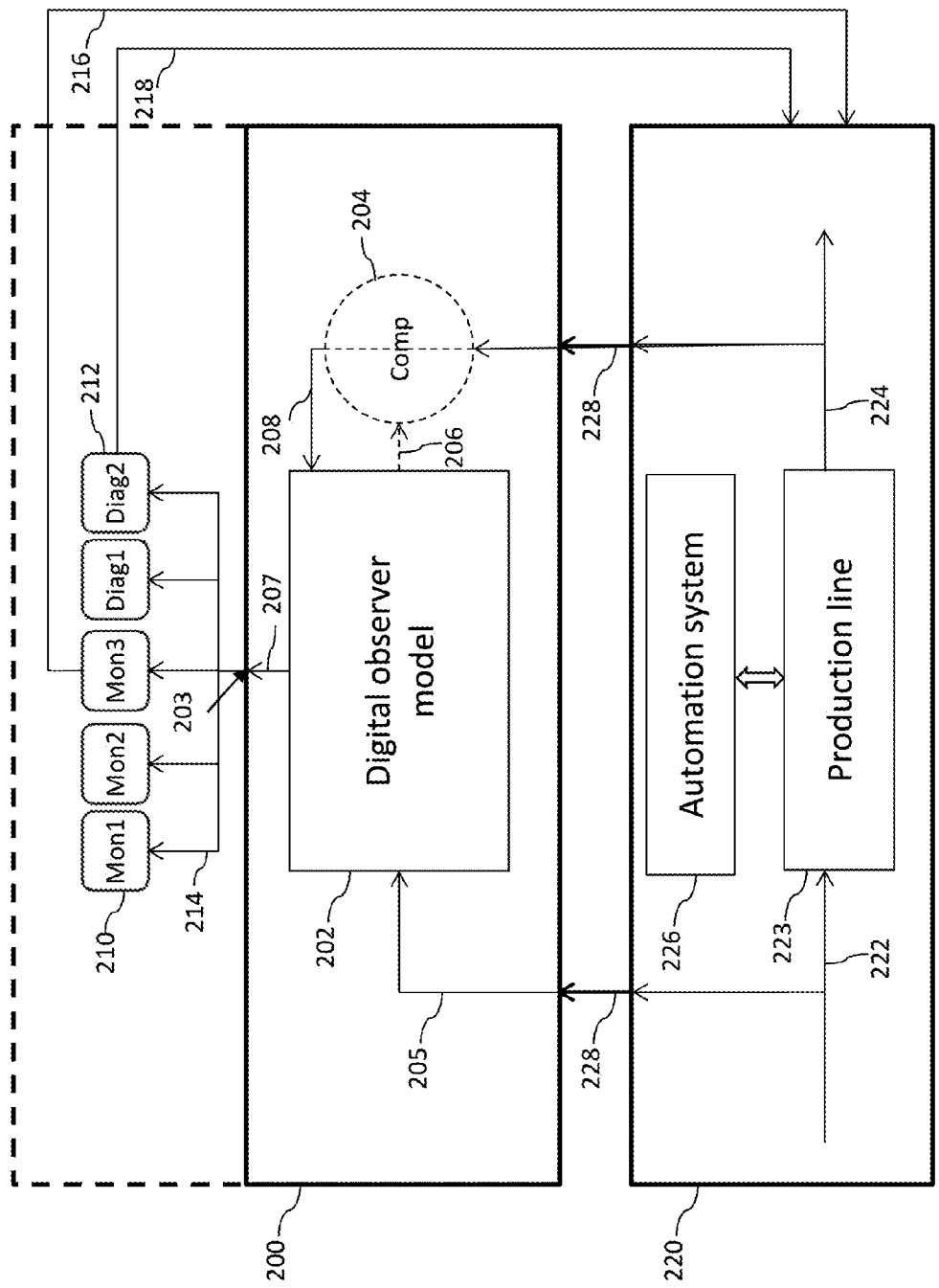

FIG. 6 illustrates a schematic overview of the interaction between a production system 220 of an industrial plant and a remote data processing server 200, where the remote data processing server 200 is installed outside of the industrial plant. Analogously to what is described above, the production system 220 includes a production line 223 and an automation system 226 for controlling operation of production line 223. The production system 220 is connected to the remote data processing server 200 via a first data communication network 228. The remote data processing server 200 is configured to process a digital observer model 202 which models the time-dependent operational behavior of the production line 223 and the automation system 226. Further, the remote data processing server 200 contains an output interface 203 to a second data communication network 214, to which different monitoring modules 210 and different diagnosing modules 212 can be connected.

During execution of the digital observer model 202, the remote data processing server 200 receives, over the first data communication network 228, a digital input signal 205 reflecting the control input signals 222 to the production line 223, and a digital output signal 208 reflecting at least one of the operational states 224 of the production system 220.

The digital input signal 205 and digital output signal 208 are input to the digital observer model 202, which contains a model of production line 223, for example, based on linear and/or non-linear state equations of the elements of the production line 223, and a model of automation system 226 containing copies of the control functions performed by the automation system 226. The digital observer model 202 is processed for a pre-determined period of time, which can be just one step in time, and thereby all operational states of the model of production line 223 and of the model of automation system 226, also called model states 207, are determined and—starting from an initial condition—updated.

The modeled states 207 are output via output interface 203 to the second data communication network 214, where they can be accessed by monitoring modules 210 and/or diagnosing modules 221. The monitoring modules 212 are software applications executed by one or more processors (general purpose or application specific) of external computer processing devices belonging (e.g., personal computers, server computers, etc.), for example, to operators of the industrial plant, which may react to any abnormalities visible in the behavior of the modeled states by initiating and/or applying suitable counteractions 216, such as tuning of parameters in the automation system, or performing fault clearance.

The diagnosing modules 221 are software applications executed by one or more processors (general purpose or application specific) of external computer devices belonging, for example, to service personnel of a supplier or sub-contractor of the industrial plant. The diagnosing of the modeled states may, for example, reveal that certain parts of the production line 223 require replacing or maintenance. The corresponding service actions 218 are then initiated and/or performed.

Instead of providing the digital output signal 224 directly to the digital observer model 202, it can first be input to a comparator 204 which is contained in the remote data processing server 200. In the comparator 204, the digital output signal 224 is compared to a corresponding modeled state 206, i.e. a real operational state is compared to its simulated counterpart. The result of this comparison is then input to the digital observer model 202 as a difference signal or correction signal 208 in order to be used for adapting the digital observer model 202.

A further alternative solution, which is indicated by a dashed extension of remote data processing server 200, is the implementation of at least parts of the monitoring modules 210 and of the diagnosing modules 212 inside the remote data processing server 200. Consequently, the second data communication network 214 becomes an internal bus. Accordingly, the computer devices used by the operators and/or service personnel can be equipped with a reduced amount of processing capacity, as they only need to provide network access to a graphical user interface of the monitoring and/or diagnosing modules, such as a Web page, for example. Similar to the exemplary embodiments illustrated with respect to FIGS. 1-4, the components of the exemplary embodiments described with respect to FIG. 6 are each implemented by one or more computer processing devices (e.g., a computer having at least one computer processor (e.g., a general purpose processor an application specific processor)) configured to execute computer-readable instructions which are tangibly recorded on a non-transitory computer-readable recording medium (i.e., non-volatile memory) for carrying out the operative functions of the illustrated components.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A system for at least one of online monitoring and diagnostics of an operation of a production system of an industrial plant,
   wherein the production system is a combination of a production line and an automation system controlling the operation of the production line, and at least one first operational state and a second operational state of the production line are dependent on at least one control input signal to the production line, the system comprising:
   a remote data processing server installed outside of the industrial plant, the remote data processing server being connected to at least one of the production line and the automation system via a first data communication network, and the remote data processing server containing an output interface connected to either (i) at least one of a monitoring module and a diagnosing module implemented in the remote data processing server, or (ii) at least one of the first communication network and a second data communication network distinct from the first communication network,
   wherein the remote data processing server comprises at least one processor configured to execute computer-readable instructions tangibly recorded on a non-transitory computer-readable recording medium, wherein the remote data processing server is configured to, when executing the computer-readable instructions:
      receive, via the first data communication network, a digital input signal reflecting the at least one control input signal, and receive, as a measured operational state, a digital output signal reflecting the second operational state;
      determine at least one first modelled state and a second modelled state corresponding to the at least one first operational state and the second operational state, respectively, by inputting the digital input and the digital output signals to a digital observer model modelling the time-dependent operational behavior of the production line and the automation system and by processing the digital observer model; and
      forward the at least first and second modelled states to the output interface,
   wherein the digital observer model contains a model of the production line based on at least one of linear state equations and non-linear state equations of elements of the production line, and a model of the automation system containing copies of the control functions performed by the automation system,
   wherein the measured operational states include signal values of sensors or actuators, software states, and information about internal variables or instruction pointers of the software programs belonging to the automation system,
   wherein the digital input signal and the digital output signal each contain a time stamp indicating a point in time when the at least one control input signal and when the second operational state were taken, respectively, and
   wherein the remote data processing server is configured to time synchronize the processing of the digital observer model with the time stamps of the digital input signal and the digital output signal.

2. The system according to claim 1, wherein the remote data processing server is configured to pre-process the first and second modelled states for monitoring and/or diagnosing purposes before forwarding the first and second modelled states to the output interface.

3. The system according to claim 1, wherein the remote data processing server is configured to start the processing of the digital observer model from a defined initial state,
   wherein the initial state is achieved by starting a production process, realized by the production line, and the processing of the digital observer model simultaneously, or by waiting until the production line and the automation system have reached a steady state and by triggering the processing of the digital observer model accordingly.

4. The system according to claim 3, comprising:
   a data collector having access to all required information that describe the defined state of the production line and the automation system,
   wherein the remote data processing server is configured to use the defined state to update the digital observer model to close a gap between simulation and reality.

5. The system according to claim 2, wherein the remote data processing server is configured to start the processing of the digital observer model from a defined initial state,
   wherein the initial state is achieved by starting a production process, realized by the production line, and the processing of the digital observer model simultaneously, or by waiting until the production line and the automation system have reached a steady state and by triggering the processing of the digital observer model accordingly.

6. The system according to claim 5, comprising:
   a data collector having access to all required information that describe the defined state of the production line and the automation system,
   wherein the remote data processing server is configured to use the defined state to update the digital observer model to close a gap between simulation and reality.

7. The system according to claim 1, wherein the remote data processing server is configured to compare the digital output signal with the second modelled state and to adapt the digital observer model based on the result of the comparison.

8. The system according to claim 1, wherein the remote data processing server is implemented on a distributed processing system including distributed storage means.

9. The system according to claim 8, wherein the remote data processing server is configured to store the at least first and second modelled states in the distributed storage means.

10. The system according to claim 1, wherein the remote data processing server is configured to determine the at least first and second modelled states at least one of continuously, periodically and on a triggered basis.

11. The system according to claim 1, wherein the second operational state is one of:
    a signal value of at least one of a sensor and actuator of the production line and automation system,
    a software state of the automation system, and
    information about at least one of an internal variable and an instruction pointer of a function being executed on a device belonging to at least one of the production line and the automation system.

12. The system according to claim 1, wherein the remote data processing server is configured to determine the at least first and second modelled states with a speed that is higher than a speed in which the first and second operational states change.

13. The system according to claim 1, wherein the remote data processing server is configured to predict the at least one first and second modelled states for a future period of time.

14. The system according to claim 1, wherein the remote data processing server is configured to process a training model containing the digital observer model and a model of a control room system, and
    wherein the control room system includes an input for an operator to affect operation of the automation system.

15. A method for at least one of online monitoring and diagnosis of the operation of a production system of an industrial plant,
    wherein the production system is a combination of a production line and an automation system controlling the operation of the production line, and at least one first operational state and a second operational state of the production line are dependent on at least one control input signal to the production line,
    wherein the method is performed by a remote data processing server which is connected to at least one of the production line and the automation system via a first data communication network, the remote data processing server containing an output interface connected to either (i) at least one of a monitoring module and a diagnosing module implemented in the remote data processing server, or (ii) at least one of the first data communication network and a second data communication network distinct from the first data communication network,
    wherein the method comprises:
    receiving, over the first data communication network, a digital input signal reflecting the at least one control input signal;
    receiving, as a measured operational state, a digital output signal reflecting the second operational state;
    determining at least one first modelled state and a second modelled state corresponding to the at least first operational state and the second operational state, respectively, by inputting the digital input signal and the digital output signal to a digital observer model of the production line and the automation system and by processing the digital observer model;
    forwarding the at least one first modelled state and the second modelled state to the output interface;
    providing the digital observer model to contain a model of the production line based on at least one of linear state equations and non-linear state equations of elements of the production line, and a model of the automation system containing copies of the control functions performed by the automation system;
    providing the measured operational states to include signal values of at least one of sensors and actuators, software states, and information about internal variables or instruction pointers of the software programs belonging to the automation system;
    providing the digital input signal and the digital output signal to each contain a time stamp indicating a point in time when the at least one control input signal and when the second operational state were taken, respectively; and
    time synchronizing the processing of the digital observer model with the time stamps of the digital input and output signals.

16. The method according to claim 15, wherein the processing of the digital observer model is started from a defined initial state,
    where the initial state is achieved by starting a production process, realized by the production line, and the processing of the digital observer model simultaneously, or by waiting until the production line and the automation system have reached a steady state and by triggering the processing of the digital observer model accordingly.

17. The method according to claim 16, comprising:
    providing a data collector for accessing all required information that describe the defined state of the production line and the automation system,
    wherein the defined state is used to update the digital observer model to close a gap between simulation and reality.

18. A non-transitory computer-readable recording medium having computer instructions tangibly recorded thereon that, when executed by a processor of a computer processing device in a remote data processing server, cause the computer processing device to carry out a method for at least one of online monitoring and diagnosis of the operation of a production system of an industrial plant,
    wherein the production system is a combination of a production line and an automation system controlling the operation of the production line, and at least one first operational state and a second operational state of the production line are dependent on at least one control input signal to the production line,
    wherein the remote data processing server is connected to at least one of the production line and the automation system via a first data communication network, the remote data processing server containing an output interface connected to either (i) at least one of a monitoring module and a diagnosing module implemented in the remote data processing server, or (ii) at least one of the first data communication network and a second data communication network distinct from the first data communication network,
    wherein, by executing the computer instructions, the computer processing device of the remote data processing server is configured to:
    receive, over the first data communication network, a digital input signal reflecting the at least one control input signal;
    receive, as a measured operational state, a digital output signal reflecting the second operational state;
    determine at least one first modelled state and a second modelled state corresponding to the at least first operational state and the second operational state, respectively, by inputting the digital input signal and the digital output signal to a digital observer model of the production line and the automation system and by processing the digital observer model;

forward the at least one first modelled state and the second modelled state to the output interface;

provide the digital observer model to contain a model of the production line based on at least one of linear state equations and non-linear state equations of elements of the production line, and a model of the automation system containing copies of the control functions performed by the automation system;

provide the measured operational states to include signal values of at least one of sensors and actuators, software states, and information about internal variables or instruction pointers of the software programs belonging to the automation system;

provide the digital input signal and the digital output signal to each contain a time stamp indicating a point in time when the at least one control input signal and when the second operational state were taken, respectively; and time synchronize the processing of the digital observer model with the time stamps of the digital input and output signals.

* * * * *